US010250345B2

(12) United States Patent
Margolies et al.

(10) Patent No.: US 10,250,345 B2
(45) Date of Patent: Apr. 2, 2019

(54) METHOD AND APPARATUS FOR DISTRIBUTION OF MEDIA CONTENT VIA MULTIPLE ACCESS TECHNOLOGIES

(71) Applicant: AT&T Intellectual Property I, L.P., Atlanta, GA (US)

(72) Inventors: Robert Margolies, Wayne, NJ (US); Rittwik Jana, Montville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/814,800

(22) Filed: Nov. 16, 2017

(65) Prior Publication Data

US 2018/0316448 A1 Nov. 1, 2018

Related U.S. Application Data

(60) Provisional application No. 62/491,824, filed on Apr. 28, 2017.

(51) Int. Cl.
| | |
|---|---|
| *H04N 7/173* | (2011.01) |
| *H04H 40/90* | (2008.01) |
| *H04N 21/436* | (2011.01) |
| *H04N 21/4363* | (2011.01) |
| *H04B 7/185* | (2006.01) |
| *H04W 28/02* | (2009.01) |

(52) U.S. Cl.
CPC ...... *H04H 40/90* (2013.01); *H04N 21/43615* (2013.01); *H04N 21/43637* (2013.01); *H04B 7/18563* (2013.01); *H04W 28/0231* (2013.01)

(58) Field of Classification Search
CPC ............. H04H 40/90; H04N 21/43615; H04N 21/43637; H04B 7/18563; H04W 28/0231
See application file for complete search history.

(56) References Cited

U.S. PATENT DOCUMENTS

| | | |
|---|---|---|
| 9,077,649 B2 | 7/2015 | Kotecha et al. |
| 9,094,946 B2 | 7/2015 | Aguirre et al. |
| 9,185,466 B2 | 11/2015 | Chadha |
| 9,223,473 B2 | 12/2015 | Mathur |
| 9,380,322 B2 | 6/2016 | Kotecha et al. |
| 9,485,667 B2 | 11/2016 | Townley et al. |

(Continued)

OTHER PUBLICATIONS

"Cost to Install a Satellite Dish", http://www.homewyse.com/services/cost_to_install_satellite_dish.html, accessed Jul. 28, 2016, 2016, 4 pages.

(Continued)

*Primary Examiner* — Kyu Chae
(74) *Attorney, Agent, or Firm* — Guntin & Gust, PLC; Mark Wilinski (57) ABSTRACT

Aspects of the subject disclosure may include, for example, a cost-efficient wireless framework for delivering TV services (e.g., live TV services). The wireless framework can include a mix of wireless access technologies (e.g. Satellite, WiFi and/or LTE overlay links). TV content (e.g., live TV content) can be injected into the network at a few locations (e.g., residential locations) using satellite antennas (e.g., satellite dishes). The content can then be further distributed to other homes using a house-to-house WiFi network and/or via an overlay LTE network. Other embodiments are disclosed.

20 Claims, 9 Drawing Sheets

(56) References Cited

U.S. PATENT DOCUMENTS

| | | | | |
|---|---|---|---|---|
| 2003/0064679 | A1* | 4/2003 | Kim | H03M 13/1515 |
| | | | | 455/3.02 |
| 2010/0169937 | A1* | 7/2010 | Atwal | H04L 45/123 |
| | | | | 725/68 |
| 2010/0313232 | A1 | 12/2010 | Norin et al. | |
| 2010/0333131 | A1* | 12/2010 | Parker | H04N 7/1675 |
| | | | | 725/31 |
| 2015/0124616 | A1 | 5/2015 | Lohman et al. | |
| 2016/0134544 | A1 | 5/2016 | Roy et al. | |
| 2016/0191147 | A1* | 6/2016 | Martch | H04B 7/18526 |
| | | | | 725/5 |
| 2016/0301456 | A1 | 10/2016 | Clevorn et al. | |

OTHER PUBLICATIONS

"LTE; Evolved Universal Terrestrial Radio Access (E-UTRA); Base Station (BS) radio transmission and reception", Technical Specification; (3GPP TS 36.104 version 10.2.0 Release 10); 3rd Generation Partnership project Std. 3GPP TS 36.104 V10.20.0, 2011, 103 pages.

"Part 11: Wireless LAN Medium Access Control (MAC) and Physical Layer (PHY) Specifications", IEEE Std. 802.11b, 1999, 96 pages.

Abdollahpouri, Alireza et al., "Unicast versus Multicast for Live TV Delivery in Networks with Tree Topology", Proc. WWIC, ACM, 2010, 14 pages.

Baliga, Jayant et al., "Energy Consumption of the Internet", Proc. COIN-ACOFT, Jun. 2007, 3 pages.

Brunnstrom, K. et al., "Future Media Distribution: An Innovation Agenda for Digital Media Distribution", Mar. 2015, 32 pages.

Clarke, Richard N., "Costs of Neutral/Unmanaged IP Networks", Review of Network Economics, vol. 8, No. 1, pp. 61-89, Nov. 2012, 29 pages.

Garcia, Miguel et al., "IPTV Distribution Network Access System Using WiMAX and WLAN Technologies", Proc. UPGRADE-CN, ACM, 2009, 10 pages.

Gary, Kim, "How Much Does Rural Fiber Really Cost?", http://blog.performantnetworks.com/2012/11/how-much-does-rural-fiber-really-cost.html, Nov. 2012, 4 pages.

Gidlund, Mikael et al., "VoIP and IPTV Distribution over Wireless Mesh Networks in Indoor Environment", IEEE Trans. Consum. Electron., vol. 54, No. 4, pp. 1665-1671, Nov. 2008, 7 pages.

Gouveia, Luis, "Multicommodity Flow Models for Spanning Trees with Hop Constraints", European Journal of Operational Research, vol. 95, No. 1, pp. 178-190, 1996, 13 pages.

Grant, Michael C. et al., "CVX: Matlab software for disciplined convex programming, version 2.1", http://cvxr.com/cvx (citing page http://cvxr.com/cvx/citing/), Mar. 2014, 99 pages.

Grant, Michael C. et al., "Graph Implementations for Nonsmooth Convex Programs", Recent Advances in Learning and Control. Springer-Verlag Limited, pp. 95-110, 2008, 16 pages.

Hei, Xiaojun et al., "A Measurement Study of a Large-Scale P2P IPTV System", IEEE Transactions on MultiMedia, vol. 9, No. 8, Dec. 2007, 16 pages.

Kerpez, Ken et al., "IPTV Service Assurance", IEEE Communications Magazine, vol. 44, No. 9, pp. 166-172, Sep. 2006, 7 pages.

Lee, Kye-Hwan et al., "QoS-Guaranteed IPTV Service Provisioning in IEEE 802.11e WLAN-based Home Network", Proc. NOMSW, Apr. 2008, 6 pages.

Li, Xinrong, "Collaborative Localization With Received-Signal Strength in Wireless Sensor Networks", IEEE Transactions on Vehicular Technology, vol. 56, No. 6, Nov. 2007, 11 pages.

Liu, Yali et al., "IPTV System Design: An ISP's Perspective", Proc. CyberC, Oct. 2011, 7 pages.

Mogensen, Preben et al., "LTE Capacity compared to the Shannon Bound", Proc. IEEE VTC, Apr. 2007, 5 pages.

Paul, P. et al., "Characterizing WiFi Link Performance in Open Outdoor Networks", Proc. IEEE SECON, Jun. 2011, 9 pages.

Paul, Pragyansmita et al., "Survey of Multicast Routing Algorithms and Protocols", Proc. of ACM ICCC, Aug. 2002, 27 pages.

She, James et al., "IPTV over WiMAX: Key Success Factors, Challenges, and Solutions", IEEE Communications Magazine, vol. 45, No. 8, pp. 87-93, Aug. 2007, 7 pages.

Shihab, Emad et al., "Wireless Mesh Networks for In-Home IPTV Distribution", IEEE Network, vol. 22, No. 1, pp. 52-57, Jan. 2008, 6 pages.

Singh, Harkirat et al., "IPTV over WirelessLAN: Promises and Challenges", Proc. IEEE CCNC, Jan. 2008, 6 pages.

Wittig, Manfred et al., "Satellite Onboard Processing for Multimedia Applications", IEEE Communications Magazine, Jun. 2000, 7 pages.

Xiao, Yang et al., "Internet Protocol Television (IPTV): The Killer Application for the Next-Generation Internet", IEEE Communications Magazine, vol. 45, No. 11, pp. 126-134, Nov. 2007, 9 pages.

* cited by examiner

METHOD AND APPARATUS FOR DISTRIBUTION OF MEDIA CONTENT VIA MULTIPLE ACCESS TECHNOLOGIES

CROSS-REFERENCE TO RELATED APPLICATIONS

This application claims the benefit of U.S. Provisional Application Ser. No. 62/491,824, filed Apr. 28, 2017, which is incorporated by reference herein in its entirety.

FIELD OF THE DISCLOSURE

The subject disclosure relates to a method and apparatus for distribution of media content via satellite.

BACKGROUND

Today, the majority of households receive TV content via cable/fiber, IP network, or satellite. In one example, Internet Protocol TV ("IPTV") streams live TV content from a few regional hub offices to set-top boxes over either a dedicated private network or over-the-top via the core IP network. To satisfy Quality of Service ("QoS") requirements, IPTV must be provisioned with a sufficiently high bandwidth in the distribution network.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for wireless distribution of media content (e.g., TV services). Other embodiments are described in the subject disclosure.

One or more aspects of the subject disclosure include a cost-efficient wireless framework for delivering TV services (e.g., live TV services). The wireless framework can include a mix of wireless access technologies (e.g. Satellite, WiFi and/or LTE overlay links).

One or more aspects of the subject disclosure include injecting TV content (e.g., live TV content) into the network at a few locations (e.g., residential locations) using satellite antennas (e.g., satellite dishes). The content is then further distributed to other homes using a house-to-house WiFi network and/or via an overlay LTE network.

Various embodiments described herein provide an all wireless solution to deliver live TV services. Some service providers now have the benefit of leveraging multiple access technologies to distribute live TV content (e.g. satellite, WiFi and LTE). Various embodiments can capitalize on this opportunity to create a distribution infrastructure that is optimized to serve large residential neighborhoods with a minimal number of TV content injection points.

In other embodiments, any appropriate communication protocols and/or infrastructure (e.g., 5G cellular, millimeter wave) may be used instead of or in addition to LTE.

In other embodiments, any appropriate communication protocols and/or infrastructure may be used instead of or in addition to WiFi.

Figure 1A:
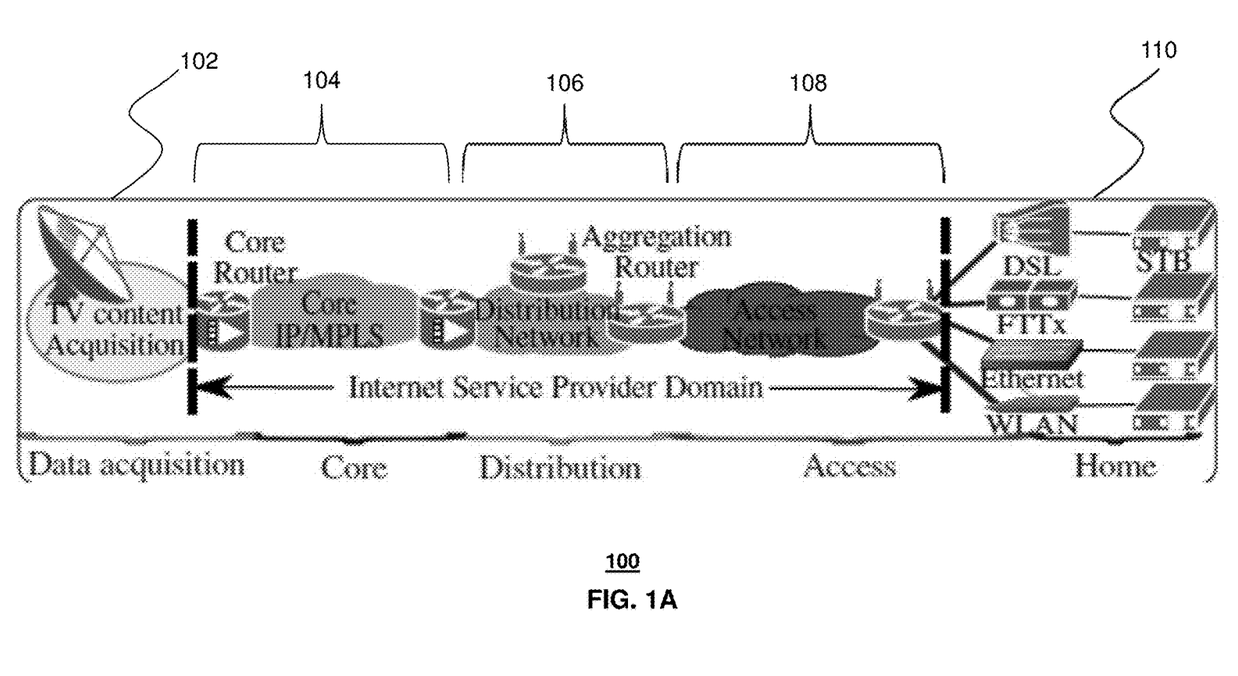
FIG. 1A depicts an illustration of a conventional IPTV architecture.

Referring now to FIG. 1A, an illustration of a conventional IPTV architecture (100) is depicted. As seen, such IPTV architecture can be divided into five main parts (i) a data acquisition network 102, (ii) core backbone network containing super hub offices (SHO) 104, (iii) a regional distribution network containing video hub offices (VHO) 106, (iv) access network 108 containing DSLAMs, and (v) customer home network 110 containing residential gateways and set-top-boxes.

Figure 1B:
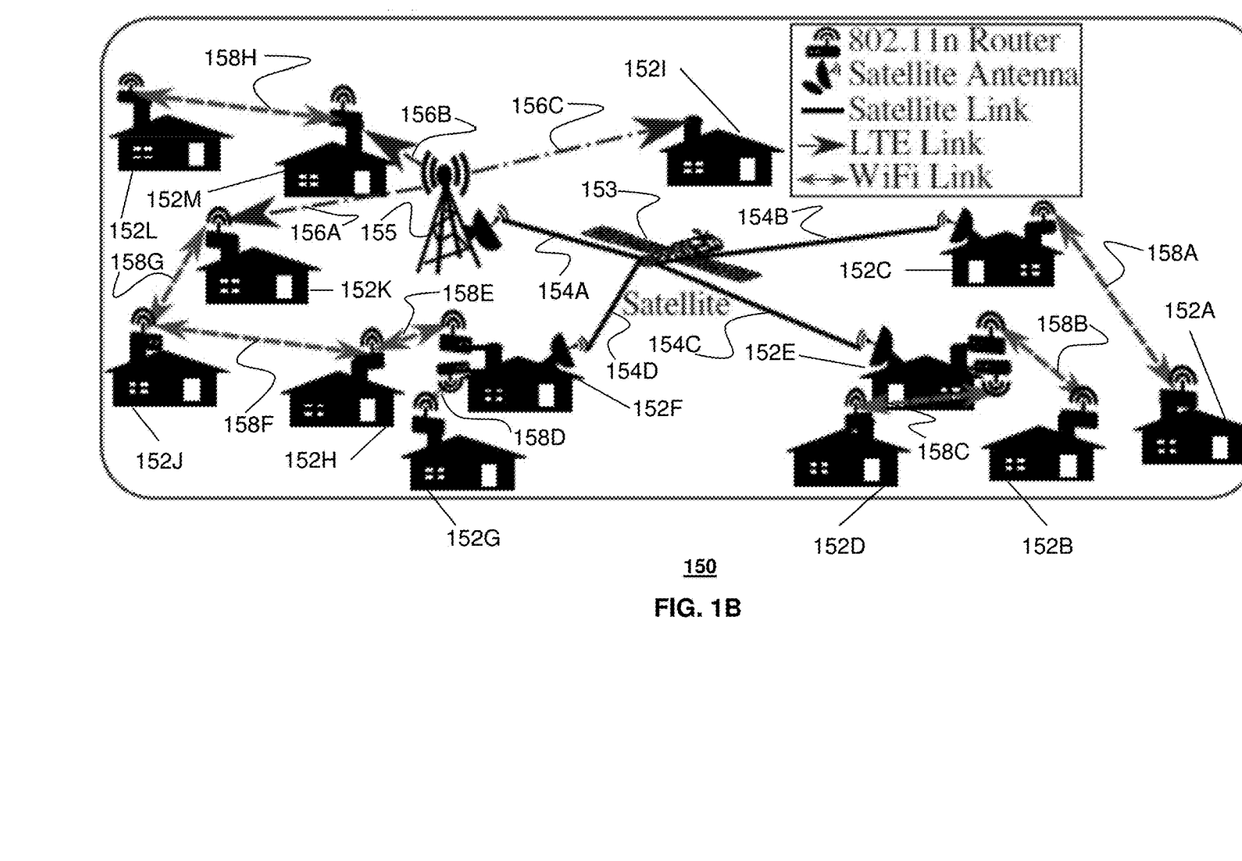
FIG. 1B depicts an illustrative embodiment of a wireless distribution system.

Referring now to FIG. 1B (showing overall system 150), the wireless distribution network according to this embodiment for TV (e.g., live TV) consists of three types of nodes:

1) A relatively small number of households (see 152C, 152E and 152F) equipped with satellite antennas act as the injection points (see satellite links 154B, 154C and 154A) for TV content. These households also have WiFi access points for relaying content (see WiFi links 158A, 158B, 158C, 158D, 158E) to WiFi-only households.

2) LTE Base Stations (see, e.g., 155), each quipped with a satellite antenna, act as additional TV injection points, and can deliver content to LTE-enabled households over unused LTE bands (see LTE links 156A, 156B and 156C).

3) Regular households are equipped with WiFi access points and LTE receivers. A regular household receives TV content from WiFi and/or LTE. It can also relay the received TV content to other regular households (see WiFi links 158A, 158B, 158C, 158D, 158E, 158F, 158G, and 158H).

As a result, a household can receive TV content by the following methods: (i) directly from satellite antenna; (ii) through WiFi relay; (iii) through LTE (direct and/or relay); and (iv) through both LTE (direct and/or relay) and WiFi relay(s). FIG. 1B illustrates the TV reception and relay methods at each node.

As described herein is an architecture in which content can be first delivered to a community through a few selected houses (with satellite antennas) and LTE Base Stations (with satellite antennas), and is then distributed to other houses using WiFi and LTE relays.

As described herein various embodiments provide for a reduction in content distribution latency.

As described herein various embodiments provide a peering network.

In another embodiment, peer-to-peer caching (e.g., of media content) is provided. For instance, content can be distributed to particular premises but not all of the premises in a given area. In one example, the particular premises for pushing the content can be selected based on various factors, such as content consumption history, demographics, user profiles, and so forth. The pushed content then can later be propagated to all or some of the remaining premises in the area, such as based on a user request or based on filling a broadcast time slot, such as where a scheduled broadcast has been cancelled (e.g., a sporting event has been cancelled).

In another embodiment, any desired type of information may be distributed and delivered (e.g., TV, movies, data, and/or advertisements).

In another embodiment, video-on-demand may be provided. For example, one or more movies may be sent via satellite link to an injection point (e.g., a particular house) and then (e.g., overnight at an underutilized time with respect to bandwidth) the movies may be sent via the network (e.g., via WiFi) to all other houses. In another example, recommended content (e.g., certain movies) may be propagated to certain houses where residents have a matching interest. In another example, the house acting as the injection point may send an acknowledgement to a controller (e.g., a central controller) when given content (e.g., an entire movie) has been received. In this example, the controller may then, responsive to receiving the acknowledgement, direct the content to be forwarded to one or more selected other houses.

In another embodiment, the type of content (e.g., TV, movies, data, advertisements) may determine how the content is delivered (e.g., by satellite, by LTE, by WiFi, via what route (that is, through which houses)).

In another embodiment, content may be pulled by a given house and/or pushed to a given house.

In another embodiment, content may be high resolution (e.g., 4K TV, 8K TV).

In another embodiment, content may be transcoded (or otherwise have its format adjusted). For example, content may be sent via satellite to an injection point (e.g., a particular house) in a highest available format. Then, as the content is propagated (e.g., via WiFi) through the network, the content resolution may be adjusted to meet the available wireless bandwidth of each target house and/or the display capability of each target house. For example, when being sent to a house without a 4K capable display, the content may first be reduced in resolution (thus, saving wireless bandwidth). The format adjustment may be carried out by hardware at each house. A controller (e.g., a central controller) may direct such format adjustment (which may be carried out dynamically at each house) based upon profile data associated with each house (and/or each subscriber at each house). The types of format adjustments can vary and can be based on various factors including historic format adjustments made prior to delivery to particular houses. In one embodiment, the format adjustment (e.g., transcoding) can be performed on-the-fly. For example, a multi-access gateway can receive the content and receive instructions (or otherwise determine) to adjust the format of the content. In this example, as the content stream is being received, the multi-access gateway can adjust the format of the content and transmit the adjusted content for propagation to other houses.

In another embodiment, a controller (e.g., a central controller) may direct content routing through the network so as to "fill-up" any links having available bandwidth.

In another embodiment, a controller (e.g., a central controller) may perform dynamic network monitoring (e.g., detecting power outage at a particular house, detecting a particular wireless transceiver being powered-on or powered-off, detecting a bandwidth availability of a particular wireless transceiver). In one example, the network monitoring may be carried out by the controller by polling the various components of the network. In another example, the network monitoring may be carried out by the controller asynchronously receiving status updates from the various components of the network. In another example, a "more important" component (e.g., a wireless transceiver at a satellite injection point) may be monitored more frequently than a "less important" component (e.g., a wireless transceiver at an edge of the network or a wireless transceiver without many active neighbors).

In another embodiment, the network can have a "control plane" and a "data plane". The control plane can be used by a controller (e.g., a central controller) to direct operation of the various components of the network (e.g., with respect to network routing). The data plane can be used to carry the payload traffic (e.g., the media content). In one example, the control plane can be carried (at least in part) by a relatively reliable link (e.g., a satellite link). In another example, the data plane can be carried (at least in part) by a relatively less reliable link (e.g., a WiFi link).

In another embodiment, a control plane can have exclusion and/or inclusion rules. For example, an exclusion rule could be to exclude from receiving and/or propagating content certain houses if their wireless transceiver latency is too high (e.g., above a threshold of X mSec). In another example, an inclusion rule could be to always pass content through a house acting as a satellite injection point).

In one embodiment, the network can monitor for or otherwise detect when equipment at the premises (e.g., a multi-access gateway or a modem that is utilized for propagating content to other houses) is inactive or otherwise unable to propagate the content. In this situation, the network can provide for alternative delivery techniques, such as propagation from a different house. In one embodiment, the monitoring and implementation of alternative delivery techniques can occur at the node level. For example, each house operating as a node can propagate to one or more other houses acting as nodes. If a first node determines that a second node is unable to receive or re-transmit the content then the first node can deliver the content to a third node which then assumes the role of the second node in delivering the content to one or more other nodes.

Figure 2:
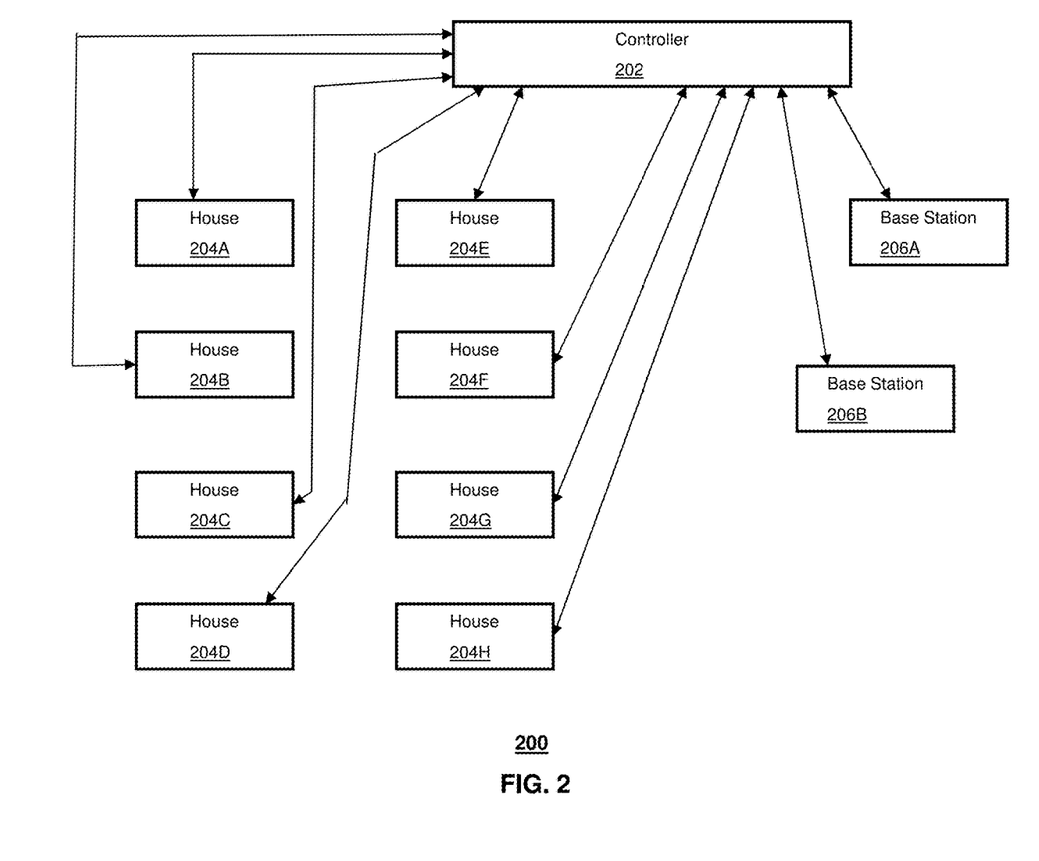
FIG. 2 depicts an illustrative embodiment of a wireless distribution system.

Referring now to FIG. 2 (showing system 200), controller 202 (e.g., a central controller) can be in operative communication with each of houses 204A-204H and each of base station 206A and 206B (of course, any desired number of controller(s), houses and/or base stations may be utilized). The controller may be in operative communication with each of the houses directly and/or through intermediary houses. The lines shown in FIG. 2 represent communication links. Each of these communication links can utilize any desired type or types of access technologies (e.g., WiFi and/or LTE). Each of these communication links can carry control plane information and/or data plane information.

In another embodiment, a multi-access gateway is provided to every house in the network. The multi-access gateway can comprise hardware for access to two or more different types of technologies. For example, the multi-access gateway can provide for cellular (e.g., LTE) access and WiFi access. In one specific example, a controller (e.g., a central controller) can switch on and off a particular access technology on a house-by-house basis. In another specific example, such switching on and off a particular access technology can be based upon cost considerations and/or spectrum usage considerations. In another specific example, such switching on and off a particular access technology can be performed by a service provider. In one embodiment, the multi-access gateway can be utilized for providing communication services to the particular premises and/or can be utilized for propagation of services (e.g., content) to other premises as described herein. In one embodiment, one or more multi-access gateways can be controlled in whole or in part by a network server to facilitate propagation of services (e.g., content) to other premises as described herein.

As described herein various embodiments provide a content distribution architecture in which content is first delivered via satellite to a community (the content is delivered to a satellite antenna at each of a few selected houses in the community and/or a satellite antenna at each of a few selected base stations (e.g., LTE base stations) in the community). After receipt of the content by the satellite antennas, the content is then distributed to the remainder of the houses in the community using, e.g., WiFi (between the houses) and/or e.g., LTE (between the base stations and the houses).

In another embodiment, the network can distribute software updates and/or patches. In one specific example, the network can distribute software updates and/or patches to cell phones (e.g., via cellular links and/or via WiFi links). As an example, the software updates can utilize the architecture described herein including transmitting and/or receiving components that utilize satellite, LTE, WiFi and/or other communication types for propagating the software updates to various recipient devices.

In another embodiment, various implementations may use a multipath TCP stream (that is, allowing a Transmission Control Protocol (TCP) connection to use multiple paths).

Figure 3A:
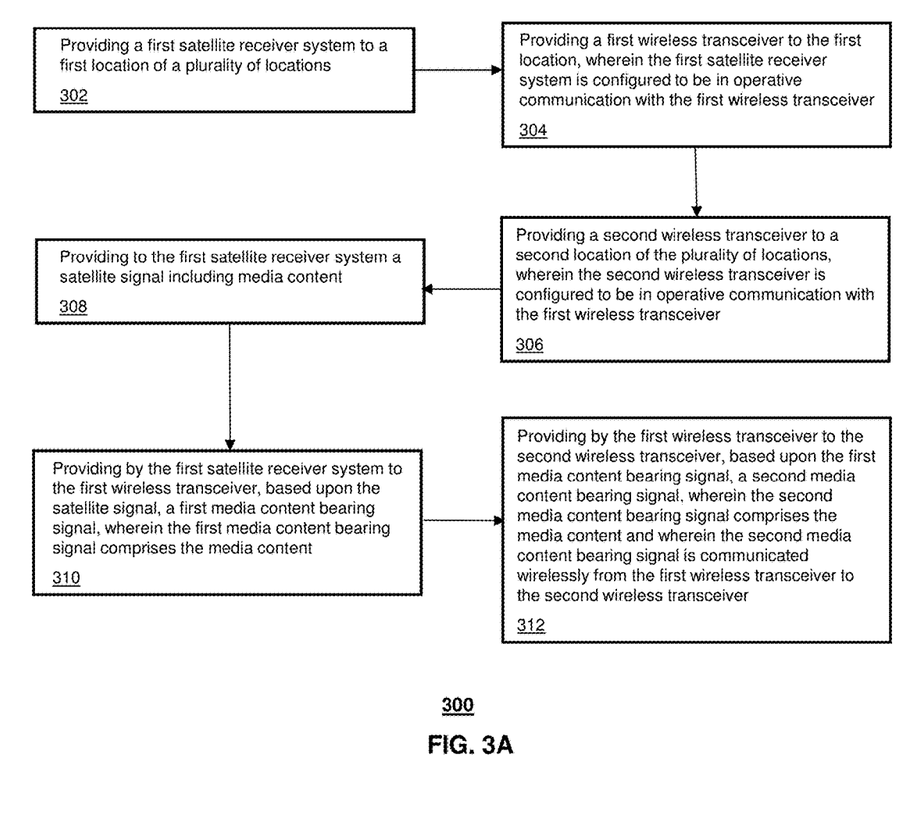
FIG. 3A depicts an illustrative embodiment of a method used in portions of the systems described in FIGS. 1B and 2.

FIG. 3A depicts an illustrative embodiment of a method used by systems 150 and/or 200. While for purposes of simplicity of explanation, the respective processes are shown and described as a series of blocks in FIG. 3A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 3A, method 300 begins at step 302 with providing a first satellite receiver system to a first location of a plurality of locations. Method 300 then continues to step 304 with providing a first wireless transceiver to the first location, wherein the first satellite receiver system is configured to be in operative communication with the first wireless transceiver. Method 300 then continues to step 306 with providing a second wireless transceiver to a second location of the plurality of locations, wherein the second wireless transceiver is configured to be in operative communication with the first wireless transceiver. Method 300 then continues to step 308 with providing to the first satellite receiver system a satellite signal including media content. Method 300 then continues to step 310 with providing by the first satellite receiver system to the first wireless transceiver, based upon the satellite signal, a first media content bearing signal, wherein the first media content bearing signal comprises the media content. Method 300 then continues to step 312 with providing by the first wireless transceiver to the second wireless transceiver, based upon the first media content bearing signal, a second media content bearing signal, wherein the second media content bearing signal comprises the media content and wherein the second media content bearing signal is communicated wirelessly from the first wireless transceiver to the second wireless transceiver.

Figure 3B:
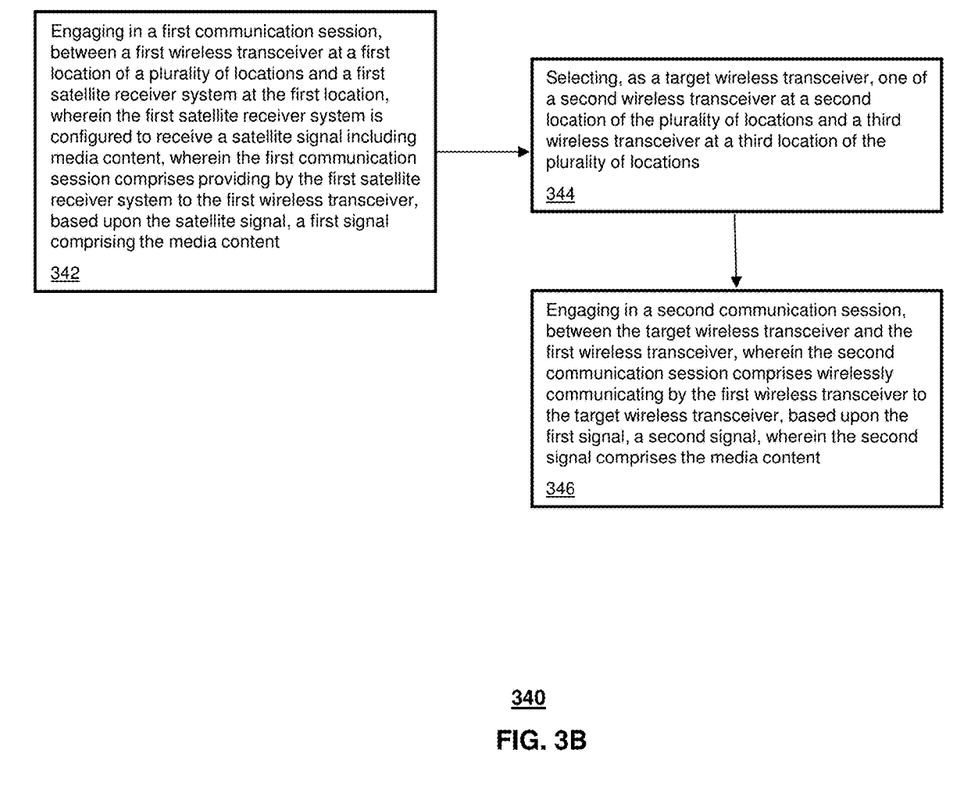
FIG. 3B depicts an illustrative embodiment of a method used in portions of the systems described in FIGS. 1B and 2.

FIG. 3B depicts an illustrative embodiment of a method used by systems 150 and/or 200. While for purposes of simplicity of explanation, the respective processes are shown and described as a series of blocks in FIG. 3B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 3B, method 340 begins at step 342 with engaging in a first communication session, between a first wireless transceiver at a first location of a plurality of locations and a first satellite receiver system at the first location, wherein the first satellite receiver system is configured to receive a satellite signal including media content, wherein the first communication session comprises providing by the first satellite receiver system to the first wireless transceiver, based upon the satellite signal, a first signal comprising the media content. Method 340 then continues to step 344 with selecting, as a target wireless transceiver, one of a second wireless transceiver at a second location of the plurality of locations and a third wireless transceiver at a third location of the plurality of locations. Method 340 then continues to step 346 with engaging in a second communication session, between the target wireless transceiver and the first wireless transceiver, wherein the second communication session comprises wirelessly communicating by the first wireless transceiver to the target wireless transceiver, based upon the first signal, a second signal, wherein the second signal comprises the media content.

Figure 3C:
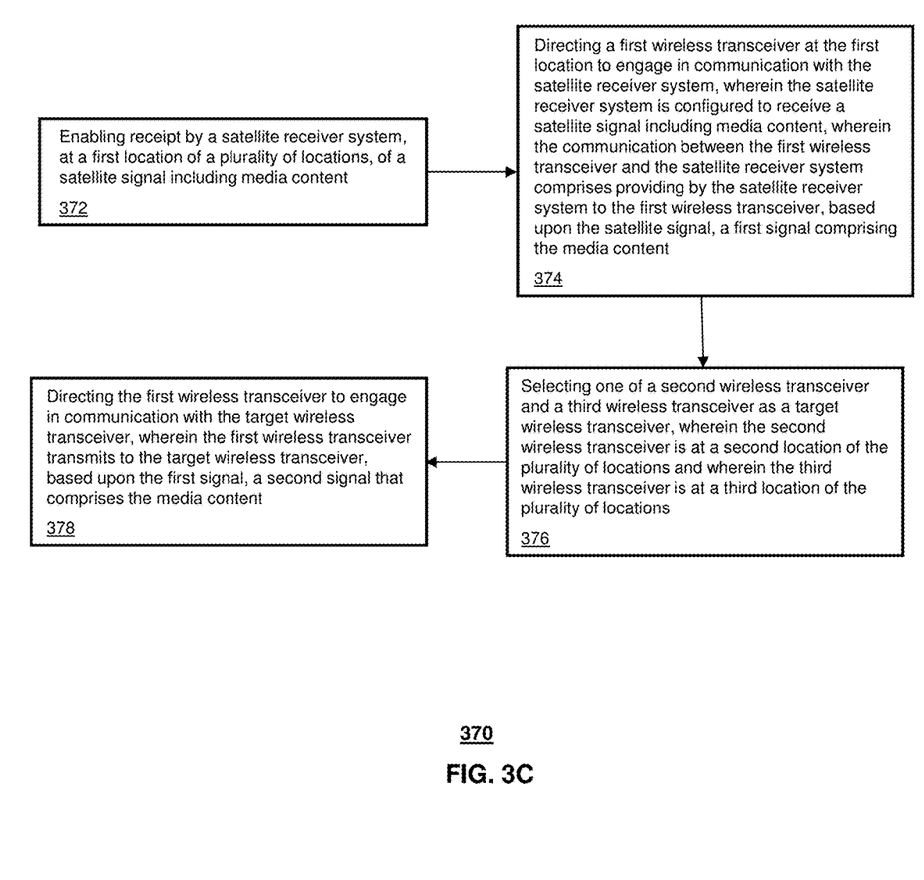
FIG. 3C depicts an illustrative embodiment of a method used in portions of the systems described in FIGS. 1B and 2.

FIG. 3C depicts an illustrative embodiment of a method used by systems 150 and/or 200. While for purposes of simplicity of explanation, the respective processes are shown and described as a series of blocks in FIG. 3C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 3C, method 370 begins at step 372 with enabling receipt by a satellite receiver system, at a first location of a plurality of locations, of a satellite signal including media content. Method 370 then continues to step 374 with directing a first wireless transceiver at the first location to engage in communication with the satellite receiver system, wherein the satellite receiver system is configured to receive a satellite signal including media content, wherein the communication between the first wireless transceiver and the satellite receiver system comprises providing by the satellite receiver system to the first wireless transceiver, based upon the satellite signal, a first signal comprising the media content. Method 370 then continues to step 376 with selecting one of a second wireless transceiver and a third wireless transceiver as a target wireless transceiver, wherein the second wireless transceiver is at a second location of the plurality of locations and wherein the third wireless transceiver is at a third location of the plurality of locations. Method 370 then continues to step 378 with directing the first wireless transceiver to engage in communication with the target wireless transceiver, wherein the first wireless transceiver transmits to the target wireless transceiver, based upon the first signal, a second signal that comprises the media content.

Figure 4:
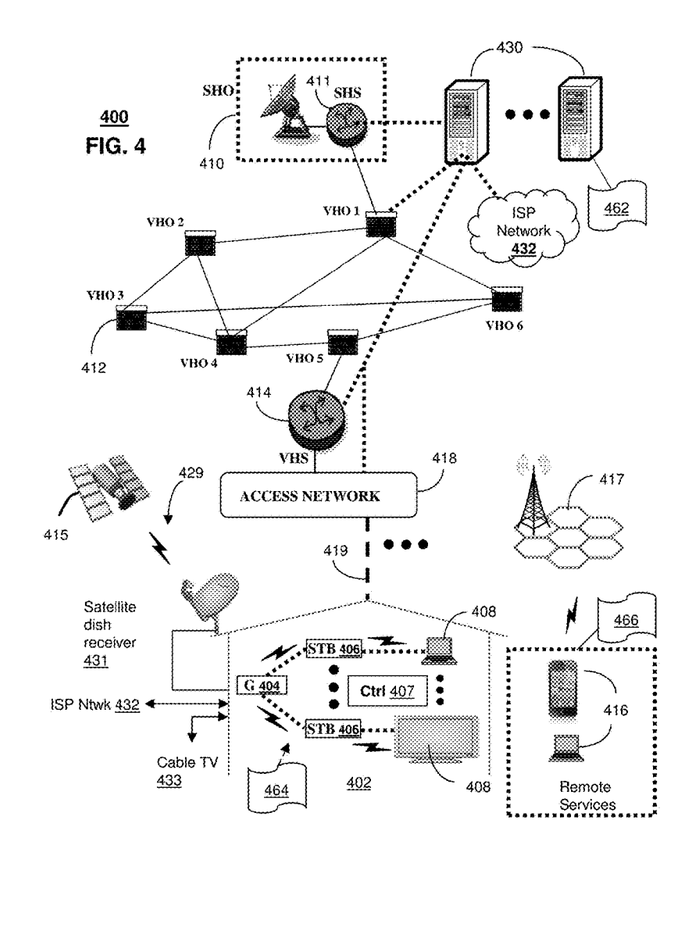
FIG. 4 depicts an illustrative embodiment of a communication system that provides media services such as, for example, services of methods 300, 340 and 370.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with system 150 of FIG. 1B and/or system 200 of FIG. 2 as another representative embodiment of communication system 400. For instance, one or more devices illustrated in the communication system 400 of FIG. 4 can provide for media content distribution.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/ or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a controller (herein referred to as controller 430). The controller 430 can use computing and communication technology to perform function 462, which can include among other things, the techniques described by methods 300, 340 and 370. For instance, function 462 of server 430 can be similar to the functions described for controller 202 of FIG. 2 in accordance with methods 300, 340 and 370. The media processors 406 and wireless communication devices 416 can be provisioned with software functions 464 and 466, respectively, to utilize the services of controller 430. For instance, functions 464 and 466 of media processors 406 and wireless communication devices 416 can be similar to the functions described for the wireless transceivers of FIG. 1B in accordance with methods 300, 340 and 370.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
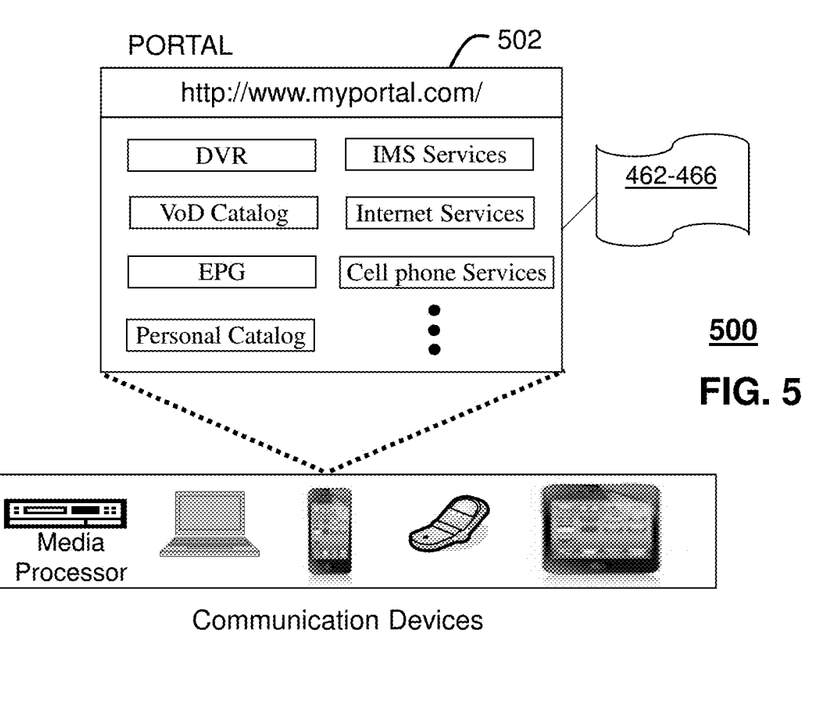
FIG. 5 depicts an illustrative embodiment of a web portal for interacting with the communication systems of FIGS. 1B, 2 and 4.

FIG. 5 depicts an illustrative embodiment of a web portal 502 of a communication system 500. Communication system 500 can be overlaid or operably coupled with systems 150, 200 and/or 400 of FIGS. 1, 2, and/or 4 as another representative embodiment of systems 150, 200 and/or 400 of FIGS. 1, 2, and/or 4. The web portal 502 can be used for managing services of systems 150, 200 and/or 400. A web page of the web portal 502 can be accessed by a Uniform Resource Locator (URL) with an Internet browser using an Internet-capable communication device such as those described in systems 150, 200 and/or 400. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 462-466 to adapt these applications as may be desired by subscribers and/or service providers of systems 150, 200 and/or 400. For instance, users of the services provided by server 430 can log into their on-line accounts and provision the server 430 with user profiles, provide contact information to the server to enable it to communication with devices described in FIGS. 1B, 2 and 4 and so on. Service providers can log onto an administrator account to provision, monitor and/or maintain the systems 150, 200 and/or server 430.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
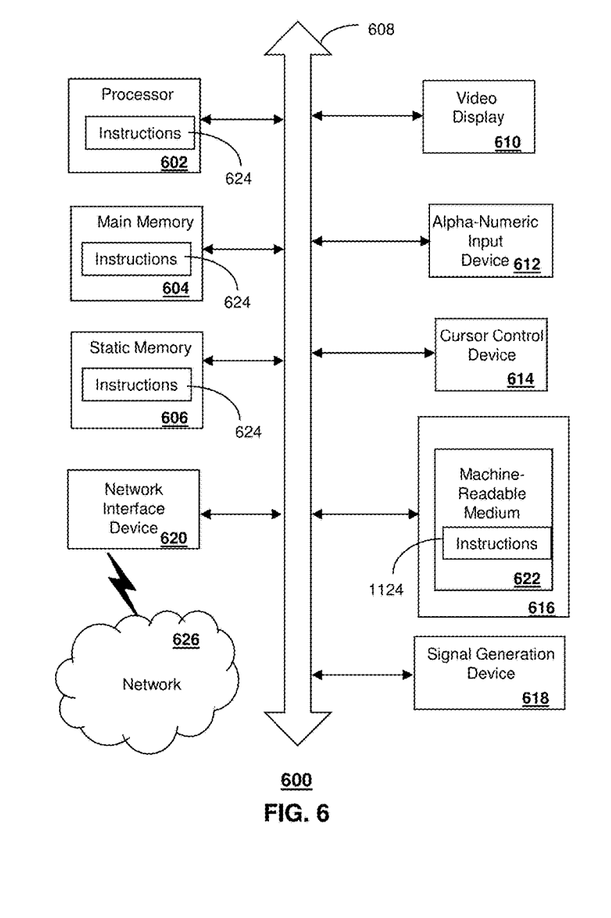
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as the controller 430, the wireless transceivers of FIG. 1B and/or the satellite receiver systems of FIG. 1B. In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile)

memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

One or more of the embodiments can utilize one or more features described in U.S. Provisional Application Ser. No. 62/491,824, filed Apr. 28, 2017, the disclosure of which is hereby incorporated by reference herein in its entirety. The one or more features described in U.S. Provisional Application Ser. No. 62/491,824, filed Apr. 28, 2017 can be utilized in place of and/or in addition to one or more features described herein with respect to the various embodiments.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
providing to a first satellite receiver system, at a first location of a plurality of locations, a satellite signal including media content, wherein the first satellite receiver system is configured to be in operative communication with a first wireless transceiver at the first location;
providing by the first satellite receiver system to the first wireless transceiver, based upon the satellite signal, a first media content bearing signal, wherein the first media content bearing signal comprises the media content;
selecting, as a target wireless transceiver, one of a second wireless transceiver at a second location of the plurality of locations and a third wireless transceiver at a third location of the plurality of locations; and
providing by the first wireless transceiver to the target wireless transceiver that is configured to be in operative communication with the first wireless transceiver, based upon the first media content bearing signal, a second media content bearing signal, wherein the second media content bearing signal comprises the media content and wherein the second media content bearing signal is communicated wirelessly from the first wireless transceiver to the target wireless transceiver,
wherein the selecting is based upon:
a first available bandwidth of the second wireless transceiver to forward the media content to a fourth wireless transceiver located at one of the plurality of locations; and
a second available bandwidth of the third wireless transceiver to forward the media content to the fourth wireless transceiver.

2. The method of claim 1,
wherein the third wireless transceiver is configured to be in operative communication with the second wireless transceiver; and
providing by the second wireless transceiver to the third wireless transceiver, based upon the second media content bearing signal, a third media content bearing signal, wherein the third media content bearing signal comprises the media content and wherein the third media content bearing signal is communicated wirelessly from the second wireless transceiver to the third wireless transceiver.

3. The method of claim 1, wherein:
the providing the first satellite receiver system to the first location comprises providing to each of a second plurality of locations, forming a first subset of the plurality of locations, a respective first subset satellite receiver system; and
the providing the first wireless transceiver to the first location comprises providing to each of the second plurality of locations forming the first subset a respective first subset wireless transceiver, wherein each first subset satellite receiver system is configured to be in operative communication with a respective first subset wireless transceiver
the method further comprising:
providing the second wireless transceiver to the second location,
wherein the providing of the second wireless transceiver to the second location comprises providing to each of a third plurality of locations, forming a second subset of the plurality of locations, a respective second subset wireless transceiver, wherein each second subset wireless transceiver is configured to be in operative communication with one of the first subset wireless transceivers and wherein the first and second subsets are mutually exclusive.

4. The method of claim 1, wherein the first location is a first residence and the second location is a second residence.

5. The method of claim 4, wherein the first residence is a first house and the second residence is a second house.

6. The method of claim 5, wherein the first residence is a first apartment in an apartment building and the second residence is a second apartment in the apartment building.

7. The method of claim 1, wherein the communication between the first satellite receiver system and the first wireless transceiver is one of a wired communication, a wireless communication, or a combination thereof.

8. The method of claim 1, wherein the first satellite receiver system comprises a satellite antenna and a satellite receiver.

9. The method of claim 1, wherein the media content is presented at the first location on a first display via a first set-top box and wherein the media content is presented at the second location on a second display via a second set-top box.

10. The method of claim 1, further comprising:
providing the first satellite receiver system to the first location;
providing the first wireless transceiver to the first location; and
providing the second wireless transceiver to the second location.

11. The method of claim 1, wherein the first location is a base station, and wherein the second media content bearing signal is a cellular signal.

12. The method of claim 11, wherein the media content includes a software update, a patch, or a combination thereof.

13. The method of claim 11, wherein the selecting is based upon:
the target wireless transceiver being configured to forward the media content to the fourth wireless transceiver using a third media content bearing signal,
wherein the third media content bearing signal is a WiFi signal.

14. A non-transitory machine-readable storage medium comprising executable instructions that, when executed by a system including a processor, perform operations comprising:
engaging in a first communication session, between a first wireless transceiver at a first location of a plurality of locations and a first satellite receiver system at the first location, wherein the first satellite receiver system is configured to receive a satellite signal including media content, wherein the first communication session comprises providing by the first satellite receiver system to the first wireless transceiver, based upon the satellite signal, a first signal comprising the media content;
selecting, as a target wireless transceiver, one of a second wireless transceiver at a second location of the plurality of locations and a third wireless transceiver at a third location of the plurality of locations; and
engaging in a second communication session, between the target wireless transceiver and the first wireless transceiver, wherein the second communication session comprises wirelessly communicating by the first wireless transceiver to the target wireless transceiver, based upon the first signal, a second signal, wherein the second signal comprises the media content, wherein the selecting is based upon:
  a first available bandwidth of the second wireless transceiver to forward the media content to a fourth wireless transceiver located at one of the plurality of locations; and
  a second available bandwidth of the third wireless transceiver to forward the media content to the fourth wireless transceiver.

15. The non-transitory machine-readable storage medium of claim 14, wherein the selecting is based upon:
  a first availability of the second wireless transceiver to forward the media content to the fourth wireless transceiver; and
  a second availability of the third wireless transceiver to forward the media content to the fourth wireless transceiver.

16. The non-transitory machine-readable storage medium of claim 15, wherein the selecting comprises the second wireless transceiver being selected as the target wireless transceiver responsive to the first availability being that the second wireless transceiver is currently capable of wireless communications and the second availability being that the third wireless transceiver is currently not capable of wireless communications.

17. The non-transitory machine-readable storage medium of claim 15, wherein the selecting comprises the second wireless transceiver being selected as the target wireless transceiver responsive to the first availability being that the second wireless transceiver is currently powered-on and the second availability being that the third wireless transceiver is currently not powered-on.

18. The non-transitory machine-readable storage medium of claim 14, wherein the selecting comprises the second wireless transceiver being selected as the target wireless transceiver responsive to the first available bandwidth being greater than the second available bandwidth.

19. An apparatus comprising:
  a processing system including a processor; and
  a memory storing executable instructions that, when executed by the processing system, perform operations comprising:
    enabling receipt by a satellite receiver system, at a first location of a plurality of locations, of a satellite signal including media content;
    directing a first wireless transceiver at the first location to engage in communication with the satellite receiver system, wherein the satellite receiver system is configured to receive a satellite signal including media content, wherein the communication between the first wireless transceiver and the satellite receiver system comprises providing by the satellite receiver system to the first wireless transceiver, based upon the satellite signal, a first signal comprising the media content;
    monitoring a network including the first wireless transceiver, a second wireless transceiver, and a third wireless transceiver, wherein the monitoring comprises receiving status information from one of the first wireless transceiver, the second wireless transceiver the third wireless transceiver, or any combination thereof;
    selecting one of the second wireless transceiver and the third wireless transceiver as a target wireless transceiver based upon the status information, wherein the second wireless transceiver is at a second location of the plurality of locations and wherein the third wireless transceiver is at a third location of the plurality of locations; and
    directing the first wireless transceiver to engage in communication with the target wireless transceiver, wherein the first wireless transceiver transmits to the target wireless transceiver, based upon the first signal, a second signal that comprises the media content,
  wherein the status information comprises a first available bandwidth capacity of the second wireless transceiver and a second available bandwidth capacity of the third wireless transceiver.

20. The apparatus of claim 19, wherein the satellite signal comprises the media content at a first resolution, wherein the second signal comprises the media content at a second resolution that is a reduced resolution relative to the first resolution, and wherein the operations comprise:
  identifying a type of the media content as TV content, a movie, data, or an advertisement;
  responsive to the identifying of the type of the media content, selecting the second signal as one of a satellite signal, an LTE signal, a 5G cellular signal, a millimeter wave signal, or a WiFi signal;
  receiving an acknowledgment from the first location that the media content has been received at the first location; and
  responsive to receiving the acknowledgment, directing the first wireless transceiver to forward the media content to the target wireless transceiver via the second signal.

* * * * *